(12) United States Patent
Meier et al.

(10) Patent No.: US 7,828,452 B2
(45) Date of Patent: Nov. 9, 2010

(54) VEHICLE MIRROR SUPPORT ASSEMBLY WITH CAST BRACE

(75) Inventors: Markus Meier, Nordheim (DE); Jurgen Pfanz, Schillingfurst (DE); Albrecht Popp, Weihenzell (DE); Simon Deffner, Flachslanden (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 410 days.

(21) Appl. No.: 12/004,736

(22) Filed: Dec. 21, 2007

(65) Prior Publication Data

US 2008/0174894 A1  Jul. 24, 2008

(30) Foreign Application Priority Data

Dec. 22, 2006 (DE) ............... 20 2006 019 379 U
Dec. 22, 2006 (DE) ............... 20 2006 019 380 U

(51) Int. Cl.
*G02B 7/182* (2006.01)
(52) U.S. Cl. .................. 359/875; 359/881; 248/479
(58) Field of Classification Search ............. 359/872, 359/875, 881; 248/479
See application file for complete search history.

(56) References Cited

U.S. PATENT DOCUMENTS 2,860,546 A  11/1958  Bolser
3,322,388 A  5/1967  Budreck
6,453,504 B1  9/2002  Burkard et al.
2003/0202263 A1  10/2003  Georges
2005/0122605 A1*  6/2005  Lang et al. ............... 359/879

FOREIGN PATENT DOCUMENTS

| DE | 197 29 366 A1 | 2/1999 |
| DE | 101 05 695 A1 | 9/2002 |
| DE | 203 12 173 U1 | 8/2003 |
| DE | 10 2005 053 002 A1 | 5/2007 |
| EP | 1 531 084 A2 | 11/2004 |
| EP | 1 531 084 B1 | 11/2004 |
| WO | WO 2005/009717 A1 | 2/2005 |

* cited by examiner

*Primary Examiner*—Alessandro Amari
(74) *Attorney, Agent, or Firm*—McNair Law Firm, P.A.; Seann P. Lahey

(57) ABSTRACT

A mirror support assembly for a motor vehicle comprising an upper support arm, an upper mounting element for mounting the upper support arms to the vehicle, a lower support arm, and a lower mounting element for mounting the lower support arm to the vehicle. A mirror head brace for uniting the upper and lower support arms includes a cast structural member made by pressure casting. The mirror head brace includes at least one longitudinal groove which determines a defined angular setting between the mirror head brace and the upper and lower support arms. The plurality of scorings functionally determine different angular settings relative to the mirror support arms of a mirror head 12 which is carried by mirror head brace.

18 Claims, 6 Drawing Sheets

VEHICLE MIRROR SUPPORT ASSEMBLY WITH CAST BRACE

BACKGROUND OF THE INVENTION

This invention is directed to a support assembly for an outside mirror on a motor vehicle, especially for a commercial vehicle, and concerns additionally an outside mirror with such a support assembly.

External, rear view mirrors for motor vehicles in accord with the state of the technology have at least one mirror head, which contains at least one mirror pane. Mirror panes of this kind can be placed rigidly or adjustably in a housing or can be directly affixed within a peripheral rim. Under certain circumstances the mirror housing can have an integral, motor operated adjustment for automatic angular positioning of the mirror pane in relation to the vertical and horizontal axes of the housing. Additionally, the external mirror may also possess heating elements for the warming of the mirror or be fitted with the like.

In one simple variant, a mirror head is fastened by a U-shaped, tubular metallic yoke having two end fixtures which fit into abutments on the vehicle. In EP 0 090 909 A3 for example, the adjustments are preset by means of clamp connections on the yoke. Conversely, EP 0 590 510 B1 teaches that clamping on the housing itself can adjustably secure the mirror head. The tubular yoke, with its own connections, can be fastened onto abutments on the vehicle with pivotal end fittings and allow angular adjustment. For this purpose, EP 0 697 311 B1 proposes the fastening of plastic bearing blocks onto the metallic, tubular yoke, whereby a frictionally restrained movement of the yoke in angular directions is possible.

Although the above designs are very stable and simple, they present a series of disadvantages. For instance, the mirror pane (when held by the housing or the adjustment device) is only restrained from unwanted turning by frictional resistance. The construction is not of the best aerodynamic design. This disadvantage increases the danger of displacement during high wind exposure. To prevent this, the yoke, when built for structural strength, disadvantageously becomes very heavy. In addition, the furnishing of additional plastic anchor bolting brings about an unwanted plurality of individual parts. This increases the cost of the manufacture of the mirror assembly and also increases expense for mounting.

EP 1 024 0541 A2 proposes, in this matter, a one-piece supporting structure which branches into two support arms each with its own mounting means. Onto the mounting means of the support arms, which are plastic in composition, a carrier plate for the mirror housing can be fastened by means of complementary joining devices. Similarly, EP 1 013 502 A1 offers a rear view mirror arrangement with a bearing body of plastic for the retention of a mirror pane, this bearing body is made in one part and includes two hollow support arms.

Also, these modes of construction lead to a multiplicity of disadvantages namely, first, the mirror housings, which have been conceived for the above mentioned tubular yoke versions, are not affixed to a support arm. In this case it becomes necessary to continually require a plurality of housing auxiliary parts. Further, it is possible that the known housing having tubular yoke supports cannot be improved by upgrading to achieve an aerodynamically more favorable design with less air resistance. Nor is it possible with such a support arm to enclose a mirror pane within a rim or a housing.

Moreover, the structural strength of the support arm, which is made completely of plastic, is so limited that a mirror affixed to a vehicle can be exceedingly damaged by vibrations due to wind or by vibrations emanating from the vehicle itself. In order to improve the limited structural strength of a totally plastic mirror supporting device, EP 1 531 084 B1 proposes to at least construct the mirror head out of metal.

For the fastening of a mirror head onto its assigned brace according to EP 1 531 084 B1, a specially designed attachment is required. In the above described tubular yoke versions, the same support arm can be used for right and left driven vehicles and the support arm is easily adapted to such a change by a simple reversal of parts. However, the attachment EP 1 531 084 B1 is of such a nature that it becomes impossible to use an identical support arm for installations on the right and left sides of a vehicle. Looking in the direction of travel, the left outside mirror, in the case of left driven vehicles, is the driver's mirror. On this account the mirror requires little angular adjustment. Conversely, in the case of right driven vehicles, this arrangement is exactly reversed. Therefore, it becomes necessary, up to this time, to continually make available four variants. These variants are, for example, driver and passenger mirrors for right driven vehicles, and driver and passenger mirrors for left driven vehicles. To this end, DE 295 04 245 U1 teaches between the mirror base and the mirror housing an additional adapter part may be installed, which affixes the housing opposite to its base at various selected angles. This now added part or parts increases not only the weight, manufacturing time, and mounting labor, but also introduces additional sources of vibration.

Because of challenges to design, mirror supporting devices can no longer be made as tubular yokes, but must now possess a shape as is disclosed by EP 1 531 084 A1. In the case of the mirror supporting devices made known by EP 1 531 084 A1, a mirror head brace is to be made of metal tubing. So that the mirror head will be mounted in the same position and angular setting as the therein contained mirror, a requirement is that fastening devices, or at least indicative markings, be placed on these metal tube elements. That is to say, for each external mirror variant, and for the left and right external mirror, different metal tube braces must be manufactured and kept in inventory. The direct costs of manufacture of various metal tubes when compared to a variant are possibly not greater, but the storage and logistic costs become excessive. Alternatively, the mirror head can be always bound in the same manner to its mirror head brace and the different angular settings be achieved by different fastenings of the mirror head onto the upper and lower support arms. This leads to a considerably high construction cost and the danger of an erroneous assembly of the parts.

Basing design on EP 1 531 084 A1, the purpose of the present invention is to create a support assembly for outside mirrors on a motor vehicle, which assures a simple mounting of mirror heads in preselected angular positions. Further, it is the purpose of the present invention to make available a left or a right external mirror for a motor vehicle with such a support assembly.

SUMMARY OF THE INVENTION

The above objectives are accomplished according to the present invention by the use of structural, mirror head support brace made by pressure casting (hereinafter referred to as "head braces") instead of a simple metal tube, it becomes possible to add scorings or ribs to assure the exact positioning of a mirror head. Such a mounting can be carried out in only one operational step and include the manufacture of mirror support arms. An additional operational step is not necessary. The head brace is always fastened in the same way at the upper and lower support arms. In this way, the outer shape that is the cross-section of the head brace would always fit the mounting dimensions for a mirror head as well as meet the desired angular displacement. The design of the metal head brace assures a satisfactory stability.

Advantageously, a hollow structural member can be installed as the head brace whereby structural strength and stability can be increased.

Preferably the head brace will be composed of pressure cast aluminum since this is light in weight and possesses satisfactory structural strength. Moreover, corrosion preventive measures necessary for steel reinforcements can be avoided.

In accord with an advantageous embodiment, the pressure cast head brace, in tubular form, have at least one first longitudinal groove by means of which the head brace can assume a desired angular setting in relation to the upper and the lower support arms. In this way, the developed torque from the head brace and from its accompanying mirror head can be transferred to the support arms. Similarly, by means of this longitudinal groove, the angular position of the head brace in relation to the support arms can be predetermined. For an increase of the transferred torque, advantageously, two or more longitudinal grooves can be provided in the head brace. Because of the fact, that these longitudinal grooves do not lie rotationally symmetric to one another, the advantage is gained that the mirror head cannot be set at an erroneous angle upon mounting. Longitudinal grooves can be made easily in a head brace.

Advantageously, in at least one of the longitudinal grooves, a plurality of scorings running in the longitudinal direction is formed which, because of their side by side apportionment, permit an exact angular positioning of the of the mirror head. Because of a plurality of different angular positions of the mirror head which are attainable on the aluminum head brace and coupled with complementary projections to fit the scorings on the head brace, the angular placement of the mirror head can be made with great exactness.

By means of the symmetrical formation of the mirror support arms, the number of auxiliary components of an external mirror for a left and a right driven vehicle has been significantly reduced. Considering the vehicle mounting means for the upper and lower support arms, the pivotal points on the vehicle at these upper and lower mounts are positionally determined in such a manner that an equal separating distance is maintained and an equal angular opening is made between the upper and the lower support arms for each mirror head. Additionally, the left and right mirror heads are so fastened onto the mirror support arms, that between the upper fastening and the lower fastening, the same ratios are present, that is, a symmetrical arrangement has been achieved.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Figure 1:
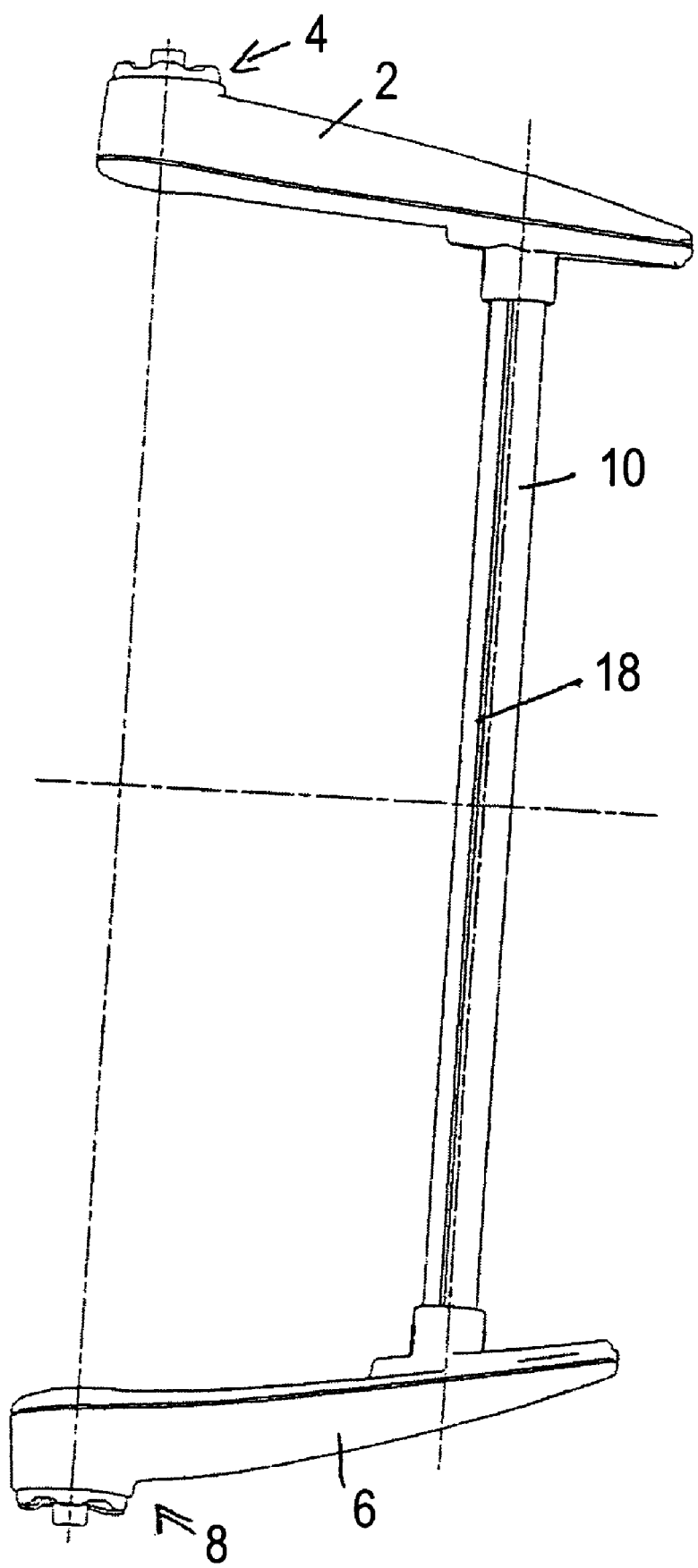
FIG. 1 is an exemplary view of a left driven vehicle embodiment of the invention as seen from a direction opposite to the direction of travel. By means of an imaginary 180° reversal of the image, a view of a right driven embodiment becomes evident.
Figure 2:
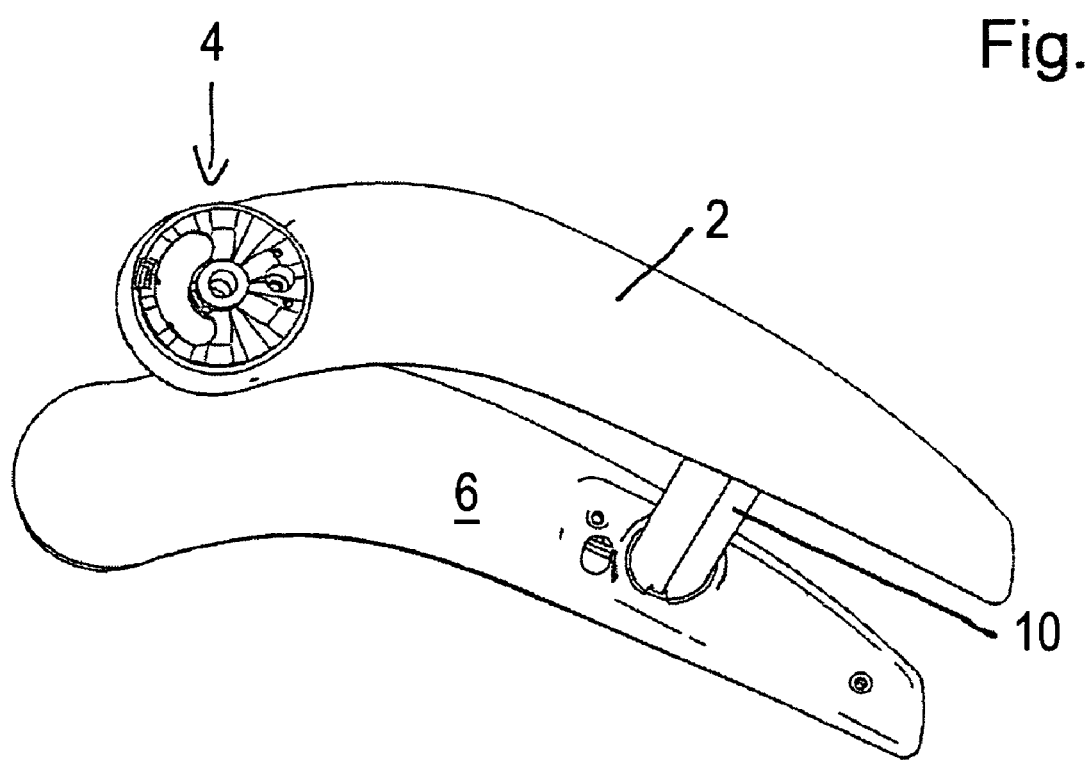
FIG. 2 is a view of the mirror support assembly, in accord with FIG. 1, seen at an angle from below.

FIGS. 1 and 2 present, as viewed, left or right driven vehicle arrangements for a mirror support assembly, which include an upper support arm 2. Upper support arm 2 has on its end which contacts the vehicle body (not shown), an upper mounting element 4 for pivotally anchoring the upper support arm to the vehicle. Further, the upper mirror support arm 2 in FIGS. 1, 2 has a lower support arm 6 which, on its end, is proximal to the vehicle body (not shown) has, in like manner, a lower mounting element 8 for pivotally anchoring the lower arm to the vehicle body. The upper and the lower mounting elements 4, 8 are constructed as frictionally restrained, pivotal fixtures, parts of which are shown in the FIGS. 1 and 2.

The upper support arm 2 and the lower support arm 6 are united together by mirror head brace 10, which is hollow in design. This head brace, although tubular, is preferably a pressure cast aluminum structural member. The ends thereof are so integrated in the upper and lower support arms 2, 6 by pressure and threaded connection, that both the ends can be encapsulated in plastic.

Figure 3:
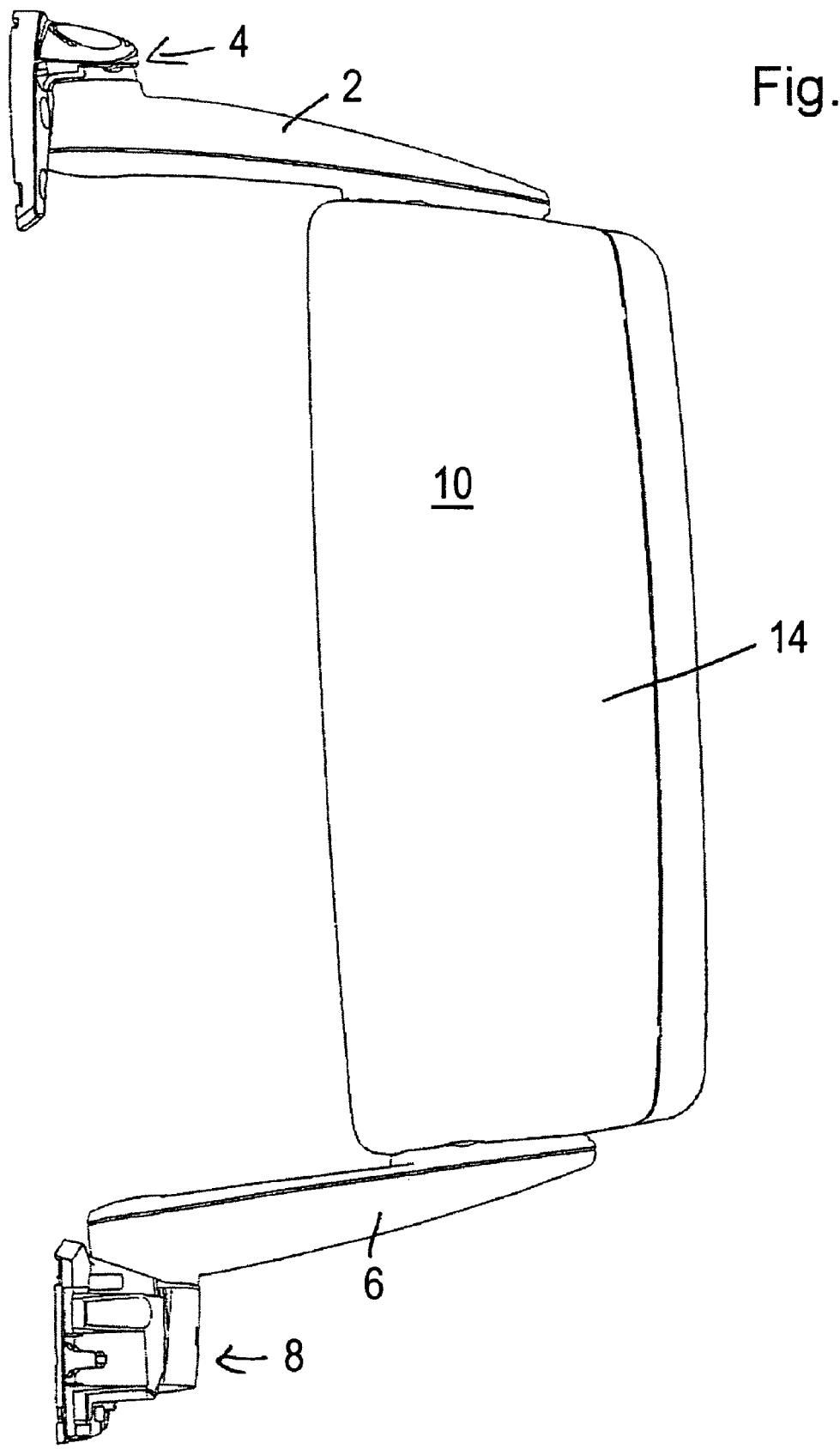
FIG. 3 is an exemplary left-side driven vehicle external mirror, as seen opposite to the direction of travel, wherein the mirror head has a support assembly in accord with FIGS. 1 and 2.
Figure 4:
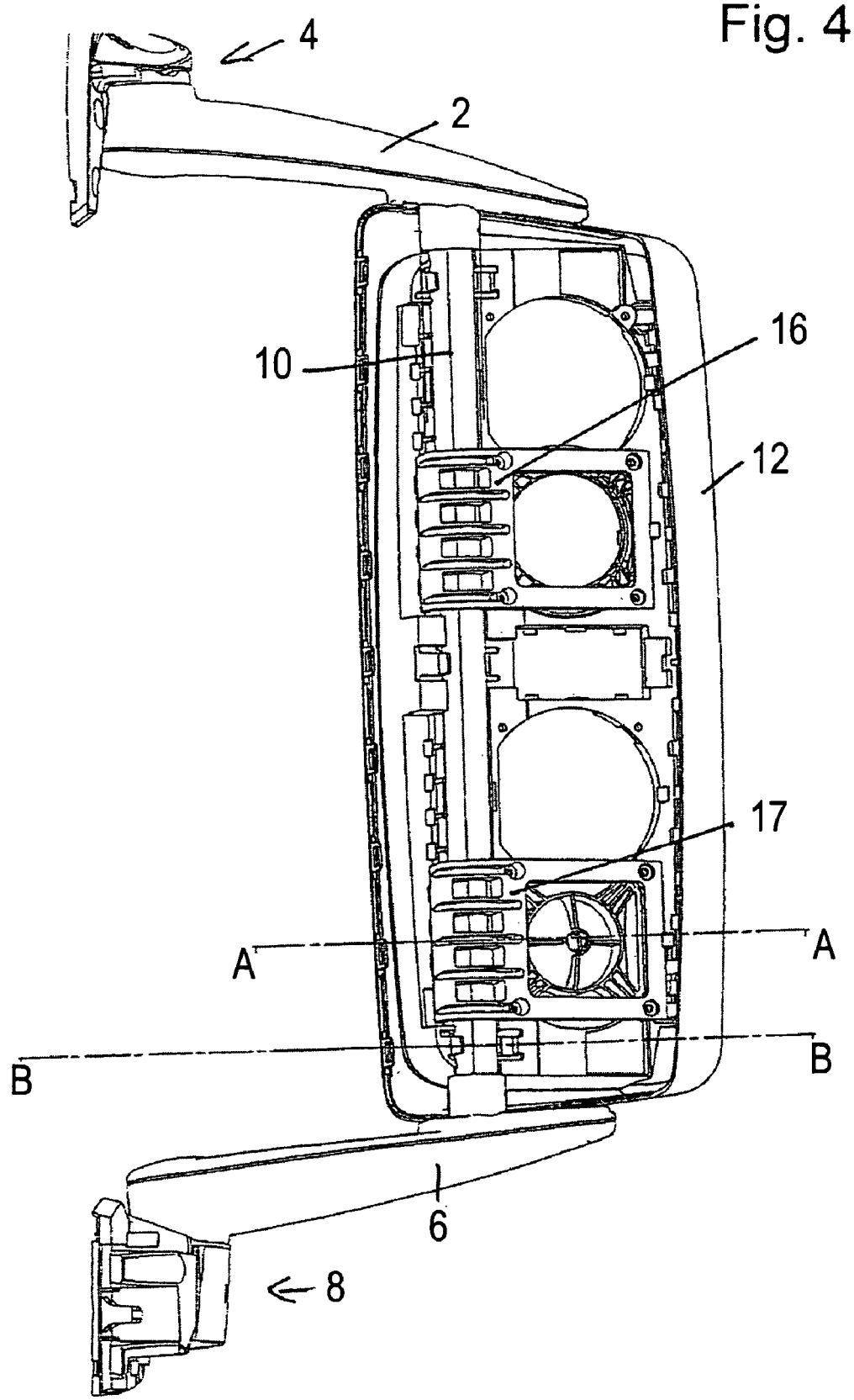
FIG. 4 is the left-side driven vehicle external mirror of FIG. 3, wherein the cover plate of the mirror head has been removed.

FIGS. 3, 4 show in a view opposite the direction of travel, a left driven external mirror equipped with support assembly as described in FIGS. 1 and 2. In this case, a mirror head 12 is mounted on the head brace 10. In FIG. 3, the mirror head 12 is covered with a casing 14. FIG. 4, accordingly, shows the same mirror head 12 with the casing removed. As may be seen in FIG. 4, the mirror head 12 is united with head brace 10 by separate upper and lower clamping connections 16, 17. Accordingly, a clamping device as made known by EP 1 020 326 is particularly well adapted for this.

FIGS. 1, 2, 5a and 5b illustrate head brace 10 as a hollow cast member and having on its outer periphery a first and a second longitudinal groove 18 and 19. Grooves 18, 19 stand in relation to one another at a separating angle of 150°. The two grooves 18, 19 allow the angular setting of the mirror head brace 10 in relation to the upper and lower support arms 2, 6 to be accurately made. By means of the shape-fit and sliding frictional fit between the mirror head brace 10 and the two support arms 2 and 6, a necessarily developed torque can be transferred from the mirror head brace 10 to the upper and lower support arms 2, 6 pivots.

Figure 5A:
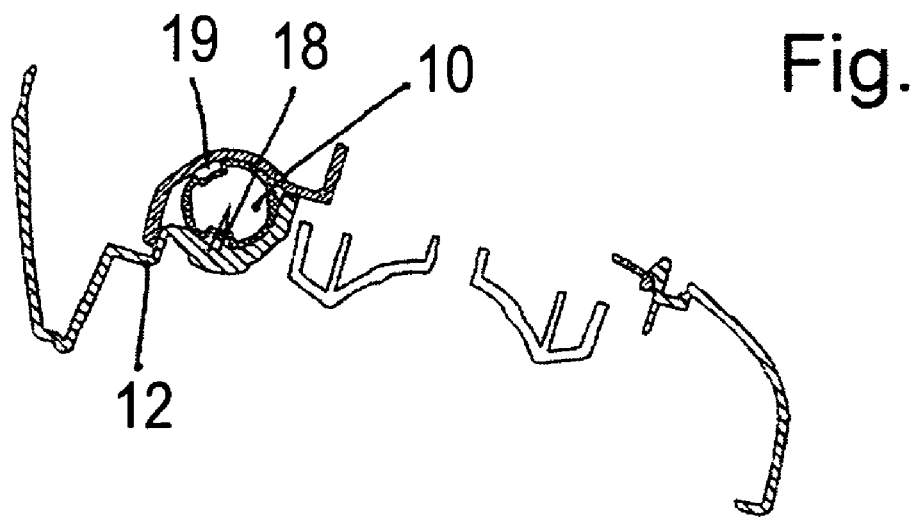
FIGS. 5a and 5b are sections along the section lines A-A, B-B of FIG. 4.
Figure 5B:
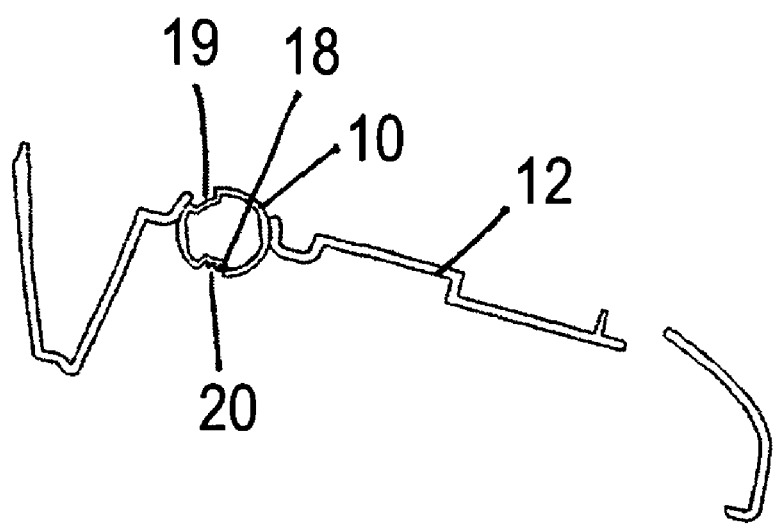
Figure 6:
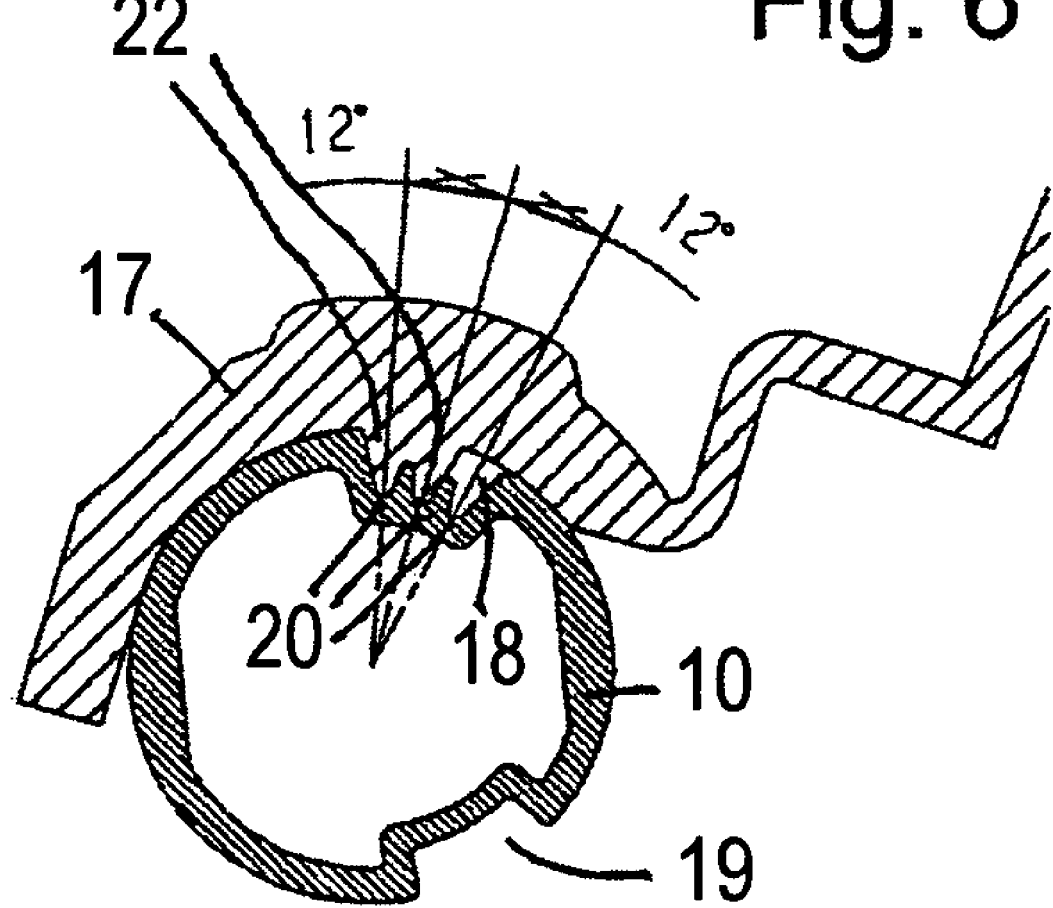
FIG. 6 is a detailed presentation of a mirror head support brace with a longitudinal groove and groove-internal scorings for the setting of different angular positions of the mirror head.

For the exact determination of the angular setting of the mirror head 12, relative to the head brace 10, one of the first or second grooves 18, 19 (this being in the illustrated case, groove 18) is provided with a plurality of longitudinal ribs scorings 20, see FIGS. 5a, 5b and 6. The spatial apportionment of these longitudinal scorings 20 determines the smallest possible incremental, angular displacement of the mirror head 12 about the head brace 10. Penetrating into scorings 20 are complementary shaped projections 22, which are provided in the upper and lower clamping connections 16, 17. By means of this adjustable shape-fit closure, the angular position of the mirror head can be exactly set. As FIG. 6 demonstrates, the exemplary embodiment of the displacement between two of the longitudinal scorings 20 is 12°. Of course, other circumferential apportionments of the scorings 20 can be made, along with the necessary adjustments to the complementary projections 22.

While a preferred embodiment of the invention has been described using specific terms, such description is for illustrative purposes only, and it is to be understood that changes and variations may be made without departing from the spirit or scope of the following claims.

What is claimed is:

1. A mirror support assembly for a motor vehicle comprising:
   an upper support arm (2), an upper mounting element (4) for mounting the upper support arm to the vehicle, a lower support arm (6), a lower mounting element (8) for mounting the lower support arm to the vehicle, and a mirror head brace (10) for uniting the upper and lower support arms (2, 6) together characterized, in that the mirror head brace (10) includes a first longitudinal groove (18, 19) received into said upper support arm (2) and said lower support arm (6) in a shape-fit arrangement so that said first longitudinal groove cooperates with said upper and lower support arms to define an angular setting between the mirror head brace (10) and the upper and lower support arms (2, 6).

2. The assembly of claim 1 wherein the mirror head brace (10) is composed of metal.

3. The assembly of claim 1 wherein the mirror head brace (10) is a hollow structural member.

4. The assembly of claim 3 wherein the mirror head brace (10) is an aluminum structural member.

5. The assembly of claim 1 wherein the mirror head brace (10) includes at least one second longitudinal groove (19) which is not placed peripherally symmetrically to the first longitudinal groove (18).

6. The assembly of claim 5 wherein at least one of said first and second longitudinal grooves (18, 19) includes a plurality of longitudinally directed scorings and ribs disposed within one of said first and second longitudinal grooves.

7. The assembly of claim 6 wherein the plurality of scorings and ribs (20) functionally determine different angular settings relative to the mirror support arms (4, 6) of a mirror head 12 which is carried by mirror head brace (10).

8. The assembly of claim 6 wherein a mirror head is mounted to said mirror head brace by at least one clamp, and said at least one clamp including a series of complementary shaped projections for cooperating with said scorings and ribs disposed within one of said first and second longitudinal grooves to define an angular setting between said mirror head and said mirror head brace.

9. The assembly of claim 1 wherein the upper support arm (2) of a left driven vehicle mirror support assembly is identical to the lower support arm (6) of a right driven vehicle mirror support assembly, and that the lower support arm (6) of a left driven vehicle mirror support assembly is identical to the upper support arm (2) of a right driven vehicle mirror support assembly.

10. The assembly of claim 1 wherein the upper and the lower mounting elements (4, 8) include a pivotal joint for adjusting the angular setting of support arms in relation to the vehicle.

11. The assembly of claim 10 wherein the pivotal joint has a frictional fit.

12. The assembly of claim 1 wherein the upper and the lower support arms (2, 6) are constructed from plastic.

13. The assembly of claim 12 wherein the mirror head brace (10) is fitted by a frictional closure with the upper and lower support arms (2, 6).

14. The assembly of claim 1 including one of a left and a right vehicle driven external mirror for a motor vehicle mounted on the at least one head brace (10).

15. A mirror support assembly for a motor vehicle comprising:
   an upper support arm (2), an upper mounting element (4) for mounting the upper support arms to the vehicle, a lower support arm (6), a lower mounting element (8) for mounting the lower support arm to the vehicle, and a mirror head brace (10) for uniting the upper and lower support arms (2, 6) wherein the mirror head brace (10) includes a first longitudinal groove (18, 19) extending the length of said mirror head brace having a plurality of longitudinally directed scorings and ribs disposed within said first longitudinal groove; and,
   a mirror head mounted to said mirror head brace by at least one clamp, wherein said at least one clamp including a series of complementary shaped projections for cooperating with said scorings and ribs disposed within said first longitudinal groove to define an angular setting between said mirror head and said mirror head brace.

16. The assembly of claim 15 wherein the mirror head brace (10) includes at least one second longitudinal groove (19) which is not placed peripherally symmetrically to the first longitudinal groove (18).

17. The assembly of claim 15 wherein the upper and the lower mounting elements (4, 8) include a pivotal joint for adjusting the angular setting of support arms in relation to the vehicle.

18. The assembly of claim 15 wherein the head brace is cast as a tubular brace.

* * * * *